United States Patent [19]

Strautman et al.

[11] Patent Number: 5,791,156
[45] Date of Patent: Aug. 11, 1998

[54] CONDENSATE DRAIN PAN FOR ROOF MOUNTED VEHICLE AIR CONDITIONING UNIT

[76] Inventors: Thomas J. Strautman, 5731 SW. 54th Ter., Davie, Fla. 33314; Russell L. Wanser, 10911 NW. 19th St., Pembroke Pines, Fla. 33026

[21] Appl. No.: 779,560

[22] Filed: Jan. 6, 1997

[51] Int. Cl.[6] .................................................. F25D 21/14
[52] U.S. Cl. ......................... 62/244; 62/291; 62/DIG. 16; 296/38
[58] Field of Search ............................... 296/38; 62/244, 62/285, 288, 291, DIG. 16

[56] References Cited

U.S. PATENT DOCUMENTS

| | | | |
|---|---|---|---|
| 3,199,307 | 8/1965 | Willis | 62/291 X |
| 3,848,428 | 11/1974 | Rigton, Jr. | 62/285 |
| 4,641,502 | 2/1987 | Aldrich et al. | 62/244 |
| 4,995,243 | 2/1991 | Ward | 62/DIG. 16 |
| 5,392,944 | 2/1995 | Jennings | 62/291 X |
| 5,437,164 | 8/1995 | Consiglio | 62/285 |

*Primary Examiner*—Dennis H. Pedder
*Attorney, Agent, or Firm*—Malin, Haley, DiMaggio & Crosby, P.A.

[57] ABSTRACT

A drain pan for collecting and draining condensate from a packaged vehicle roof mounted air conditioning unit. The drain pan has an opening registering with the roof opening for air distribution and control components within the vehicle, a bottom surface gasket for this opening, and an upper surface to seal against a gasket for the air conditioning unit.

6 Claims, 6 Drawing Sheets

# CONDENSATE DRAIN PAN FOR ROOF MOUNTED VEHICLE AIR CONDITIONING UNIT

BACKGROUND OF THE INVENTION

1. Field of the Invention

The present invention relates to air conditioning systems, and more particularly to a condensate drain pan for roof mounted vehicle air conditioning units.

2. Description of the Prior Art

Mechanical air conditioning systems have heretofore been developed for vehicles, such as motor homes and the like. Typically, these systems supplement the vehicle's cab air conditioner and comprise "package units" wherein all of the necessary mechanical components are combined in a compact unit designed for external mounting (e.g. roof mounted) on a vehicle with air supply and return duct connections provided for circulating conditioned air within the vehicle in conjunction with an interior mounted air distribution and control module. The necessary mechanical components include a compressor, an evaporator, a condenser and condenser fan, and various refrigeration fittings including a thermostatic expansion valve, refrigerant receiver, and a combination filter-drier.

The basic function of a vehicle air conditioner is to maintain a controlled comfort condition by cooling, dehumidifying, filtering or cleaning, and circulating air within the vehicle. It may also provide ventilation by introducing outdoor air into the vehicle and/or exhausting vehicle air to the outside. Furthermore, passenger comfort is enhanced by controlling the vehicle's interior temperature through selection of a desired thermostat setting.

These systems operate using a conventional heat transfer refrigeration cycle wherein warm vehicle air passes over the evaporator coil and, in the process, gives up its sensible and latent heat causing excess humidity to condense and drip from the evaporator coil as condensate. The conditioned air is then recirculated in the vehicle by the unit's fan or blower.

A common problem with these type of roof mounted vehicle package air conditioning systems involves the drainage of condensate. These systems commonly allow condensate to drain from the unit onto the vehicle, typically over the vehicle roof. However, allowing condensate to drain from roof mounted air conditioners in this manner results in the undesirable condition wherein condensate flows over the external surfaces of a vehicle, such as over the roof and down the vehicle sides. For example, condensate draining from a roof mounted air conditioning unit onto the roof of a parked motor home produces a substantially constant flow of water over the vehicle's exterior surfaces, which, over time, causes discoloration and leads to corrosion of the vehicle's surfaces. In addition, if the vehicle's external structure includes defective seals, condensate may drain into the vehicle structure wherein internal structural components may be damaged.

Accordingly, the prior art method of condensate drainage from an air conditioning unit mounted on the roof of a vehicle consists of allowing the condensate to drain from the unit onto the vehicle's external surfaces. Furthermore, most roof mounted vehicle air conditioning units do not even incorporate a condensate drain connection which would enable the user to connect a drain line to route the condensate away from the vehicle. A number of prior art references fail to remedy the problems of condensate drainage in the art.

U.S. Pat. No. 3,199,307, issued to Willis, discloses a water evaporator for an automobile air conditioner, an object of which is the addition of a vacuum drain tube to the factory installed drain pan located beneath the evaporator coil for providing a siphon for removing condensate. Willis relies on vehicle movement and moving air associated therewith to create suction to remove condensate. Furthermore, the Willis invention is not directed to providing a condensate drain pan for collecting condensate from around the perimeter of the cooling unit.

U.S. Pat. No. 5,392,944, issued to Jennings, discloses a leaked water collection pan for an evaporative cooler wherein a rectangularly shaped pan is located beneath an evaporative cooler for collecting water leaking through a corroded cooler base. However, the Jennings device is directed to collecting water leaking from evaporative coolers, and is not directed toward draining condensate. For example, Jennings contemplates that water leaking from a defective evaporative cooler will accumulate in a pan until the condensate reaches a certain level whereafter the condensate drains from weep holes.

U.S. Pat. No. 3,848,428, issued to Rieter, discloses an air conditioning system for a locomotive cab and requires a condensate drain pan located within the cab. The requirement of a condensate drain pan within a vehicle is highly undesirable since any leakage from the pan would spill out into the vehicle's interior. In addition, Rieter's condensate drain configuration requires the connection of a condensate drain line within the vehicle to route condensate to a suitable location.

Accordingly, the prior art does not disclose a condensate drain pan for use with a roof mounted vehicle air conditioner for draining condensate from the unit such that the condensate does not spill out over the vehicle. Thus, there exists a need for a condensate drainage system for externally mounted vehicle air conditioners which collects and drains condensate from the system without allowing the condensate to flow over the vehicle's external surfaces.

SUMMARY OF THE INVENTION

The present invention comprises a condensate drain pan for use with a roof mounted package air conditioning unit on a vehicle. The invention includes a drain pan adapted for a sandwiched installation, between the air conditioning unit and the vehicle roof, for collecting and draining condensate, condensed from the air by the unit's evaporator coil, from the unit. The drain pan includes: a generally planar pan surface defining an opening through which various system components, such as electrical connections and supply and return duct connections, may pass to, or from, the vehicle interior; a peripheral lip having a plurality of condensate drain connections for selective draining of accumulated condensate via suitable tubing; and, gasket material disposed on the undersurface of the pan and around the pan opening, for providing a positive seal between the pan and the vehicle roof structure and for supporting the pan in spaced relation relative to the vehicle roof.

In the preferred embodiment the drain pan of the present invention is fabricated from a suitable plastic type material and is substantially rectangular in shape. Furthermore, the pan opening is defined a generally square cut-out having dimensions which conform to the requirements of the roof mounted unit.

The drain pan of the present invention is installed by first removing the roof mounted unit from its installed position on the vehicle, then placing the pan on the vehicle roof such that the pan opening is aligned with the existing opening in the vehicle roof and such that gasket material attached to the pan's undersurface is sandwiched between the vehicle roof and the pan in surrounding relation with the roof and pan openings. Next, the air conditioning unit is re-installed such that the drain pan is sandwiched between the vehicle roof and the gasketed bottom of the air conditioning unit with the air conditioning unit's gasket being sandwiched between the undersurface of the unit and the pan's upper surface. Finally, condensate drain tubing is connected to at least one of at least four (4) condensate drain connection points on the pan's peripheral lip for routing condensate from the pan to a suitable location. Accordingly, condensate draining from the unit is collected in the drain pan and drained through suitable tubing to an appropriate location such that condensate does not spill over the vehicle's surfaces. The condensate is prevented from exiting the pan's system components opening by the surrounding gasketing material which forms a water-tight seal.

In accordance with these and other objects which will become apparent hereinafter, the instant invention will now be described with particular reference to the accompanying drawings.

DESCRIPTION OF THE PREFERRED EMBODIMENTS

Figure 1:
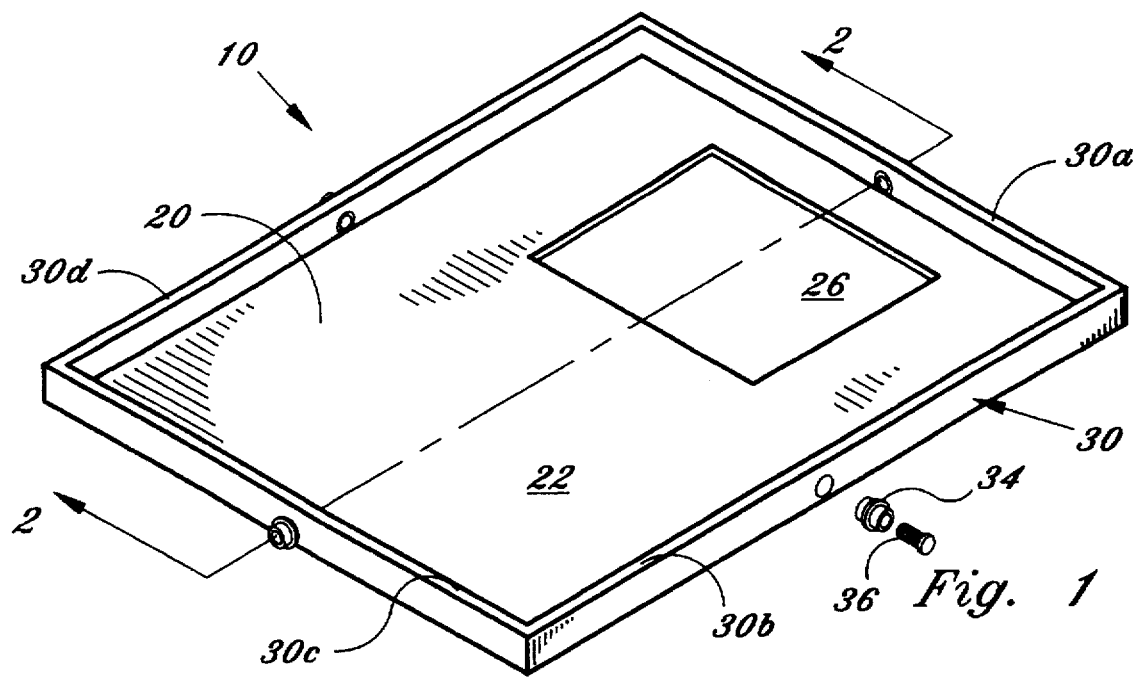
FIG. 1 is a perspective view of the drain pan of the present invention.
Figure 2:
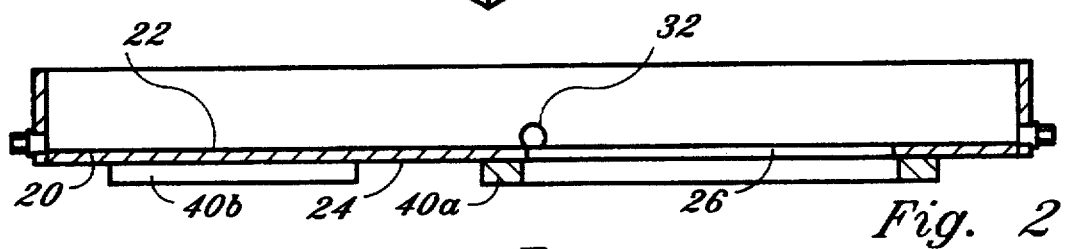
FIG. 2 is a sectional view of the drain pan along line 2—2 illustrated in FIG. 1.
Figure 3:
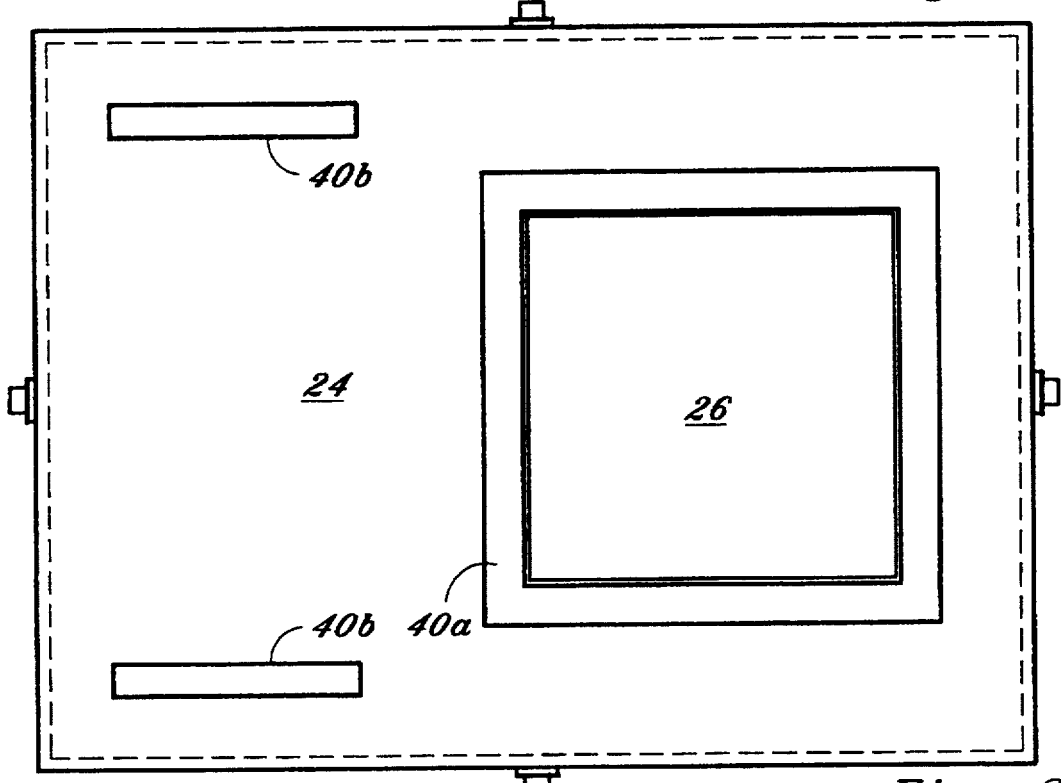
FIG. 3 is a bottom plan view of the drain pan of the present invention.

With reference now to the drawings, and with particular reference to FIGS. 1–3, there is disclosed a preferred embodiment of the condensate drain pan of the present invention, generally referenced as 10. The drain pan includes a structure which is adapted for installation between an air conditioning unit and a vehicle roof, as more fully discussed below, for collecting and draining condensate, generated by the air conditioning unit's evaporator coil. Drain pan 10 includes a generally planar, horizontal pan floor 20 having top and bottom surfaces, 22 and 24 respectively. Pan floor 20 defines an opening 26, sized and positioned depending upon the make and model of air conditioning unit for reasons that will soon become apparent. In the preferred embodiment, drain pan 10 has a length of approximately forty (40") inches, and a width of approximately thirty (30") inches, while opening 26 is substantially square, having a length and width of approximately fourteen and three-quarters (14¾") inches.

Pan 10 further includes a peripheral lip, generally referenced as 30. In the preferred embodiment, includes lip 30 comprises sections 30a–d which cooperate to form a continuous peripheral lip extending vertically upward approximately 1.5" from pan surface 22; however, any suitable lip dimensions are within the scope of the invention. Lip sections 30a–d are joined with pan floor 20 in a water-tight manner. Each lip section 30 a–d further defines at least one condensate drain aperture 32 and drain connection fitting 34. Drain connection fittings 34 include a projecting, internally threaded portion 34a, and a removable, externally threaded drain plug 36, threadably received therein; it should be evident, however, that any suitable drain connection fittings are within the scope of the invention. Lastly, bottom surface 24 of pan floor 20 includes a gasket 40a attached thereto and surrounding pan opening 26, and a pair of gasket material strips 40b, for reasons which will soon become apparent. In the preferred embodiment gaskets 40a and 40b comprise any suitable gasket material, preferably being approximately 1" thick (non-compressed), and adhesively attached to surface 24, as best depicted in FIG. 3.

Figure 4:
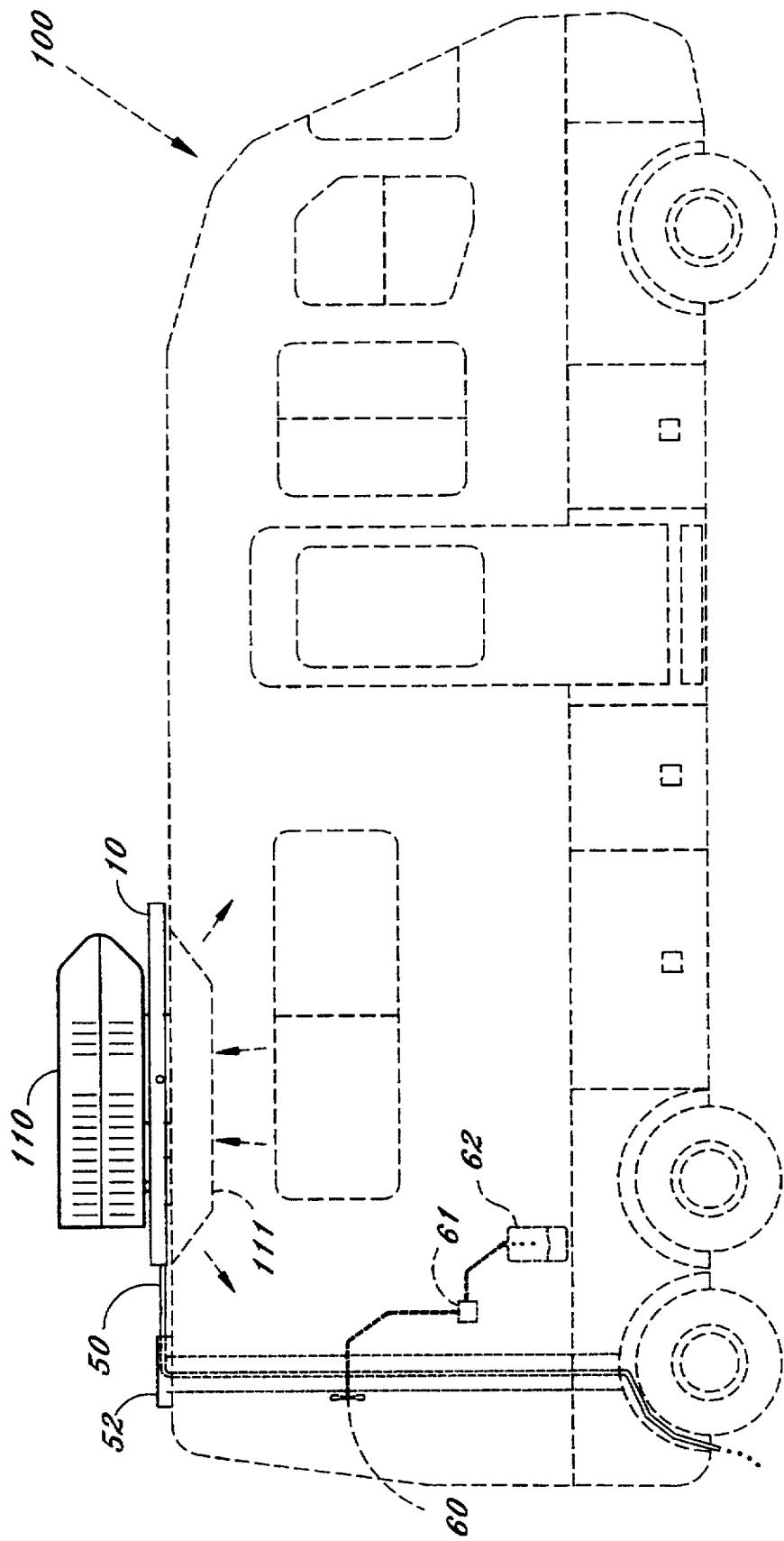
FIG. 4 illustrates the drain pan of the present invention installed with an air conditioning unit on a motor home vehicle.
Figure 5:
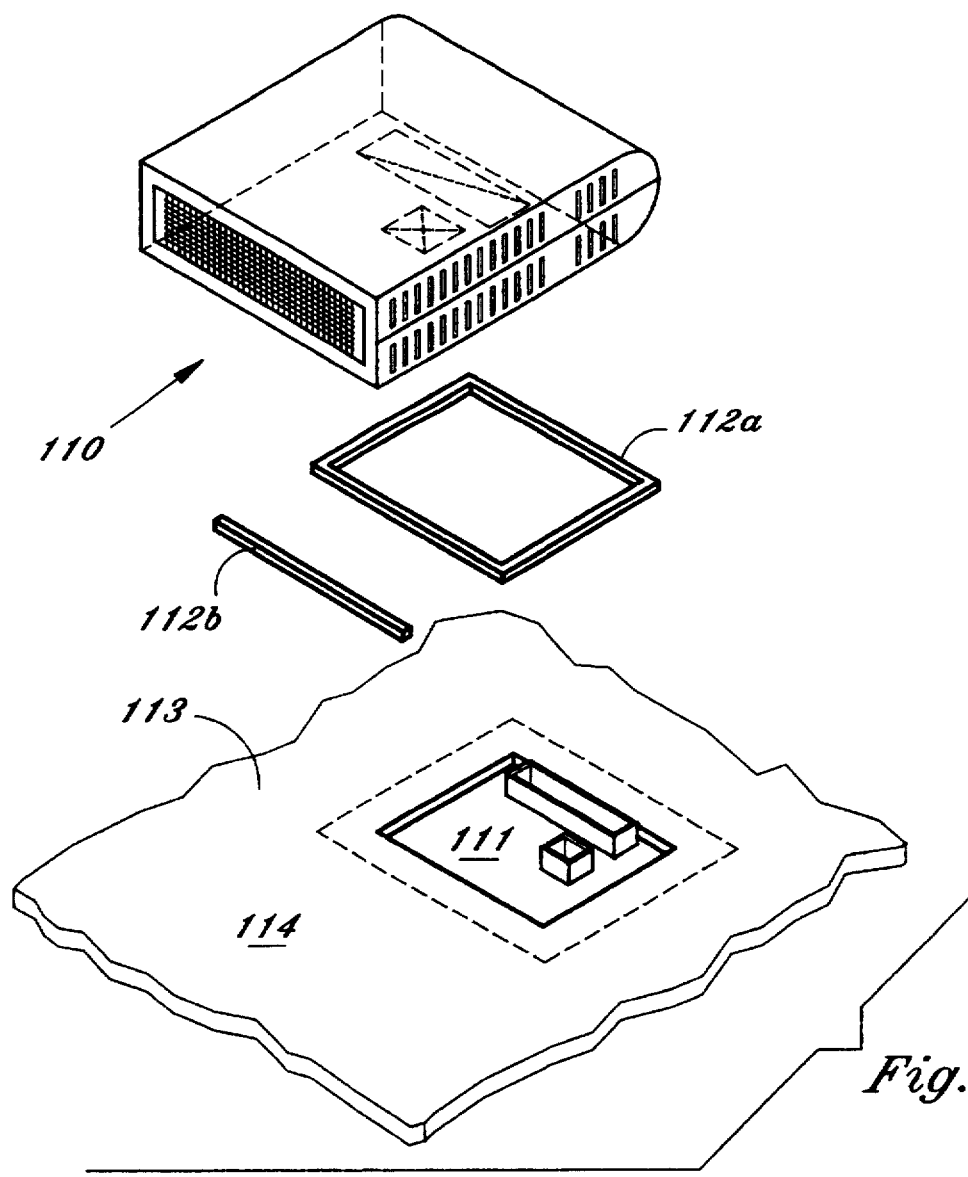
FIG. 5 is a detail, in exploded perspective view, of a prior art mounting configuration for a roof mounted vehicle air conditioner.
Figure 6:
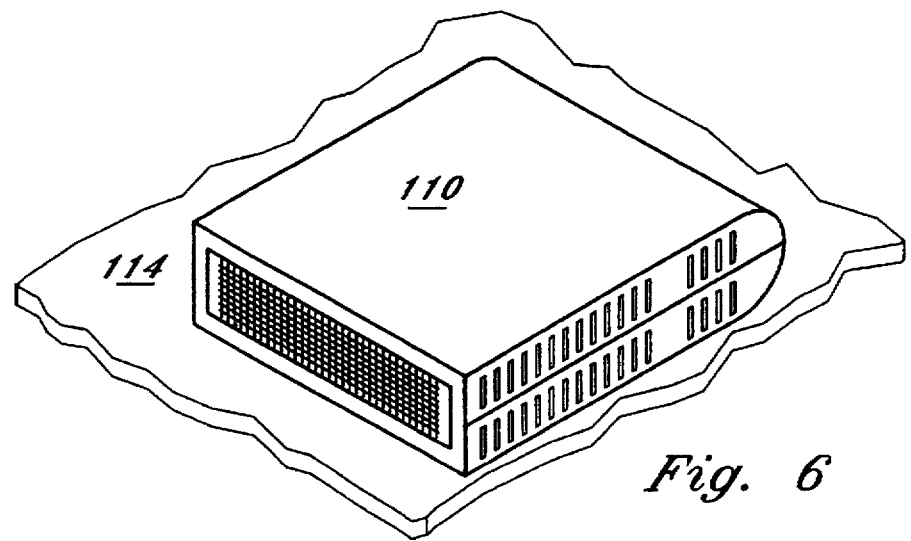
FIG. 6 is a detail, in perspective view, of a prior art mounting configuration for a roof mounted vehicle air conditioner depicted in FIG. 5.
Figure 8:
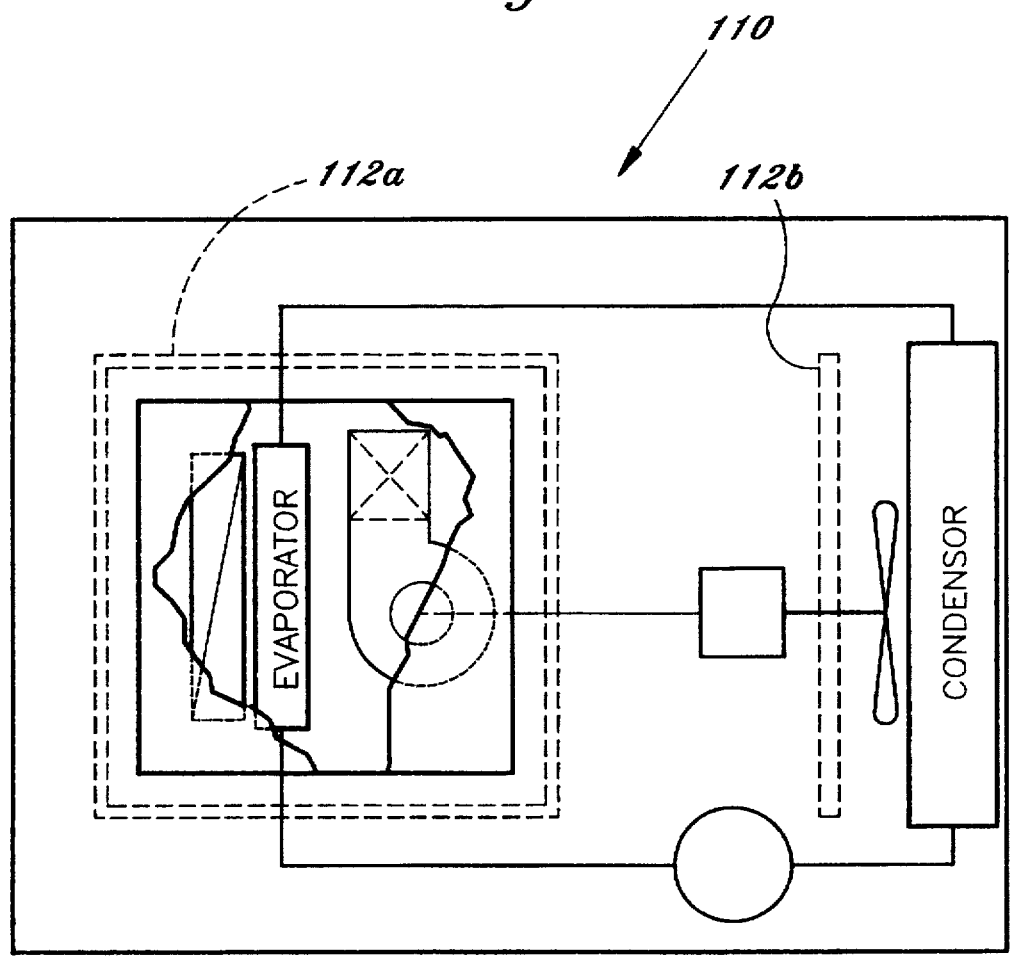
FIG. 8 is a schematic representation of the arrangement of the mechanical refrigeration components of the vehicle air conditioning system.
Figures 9, 10:
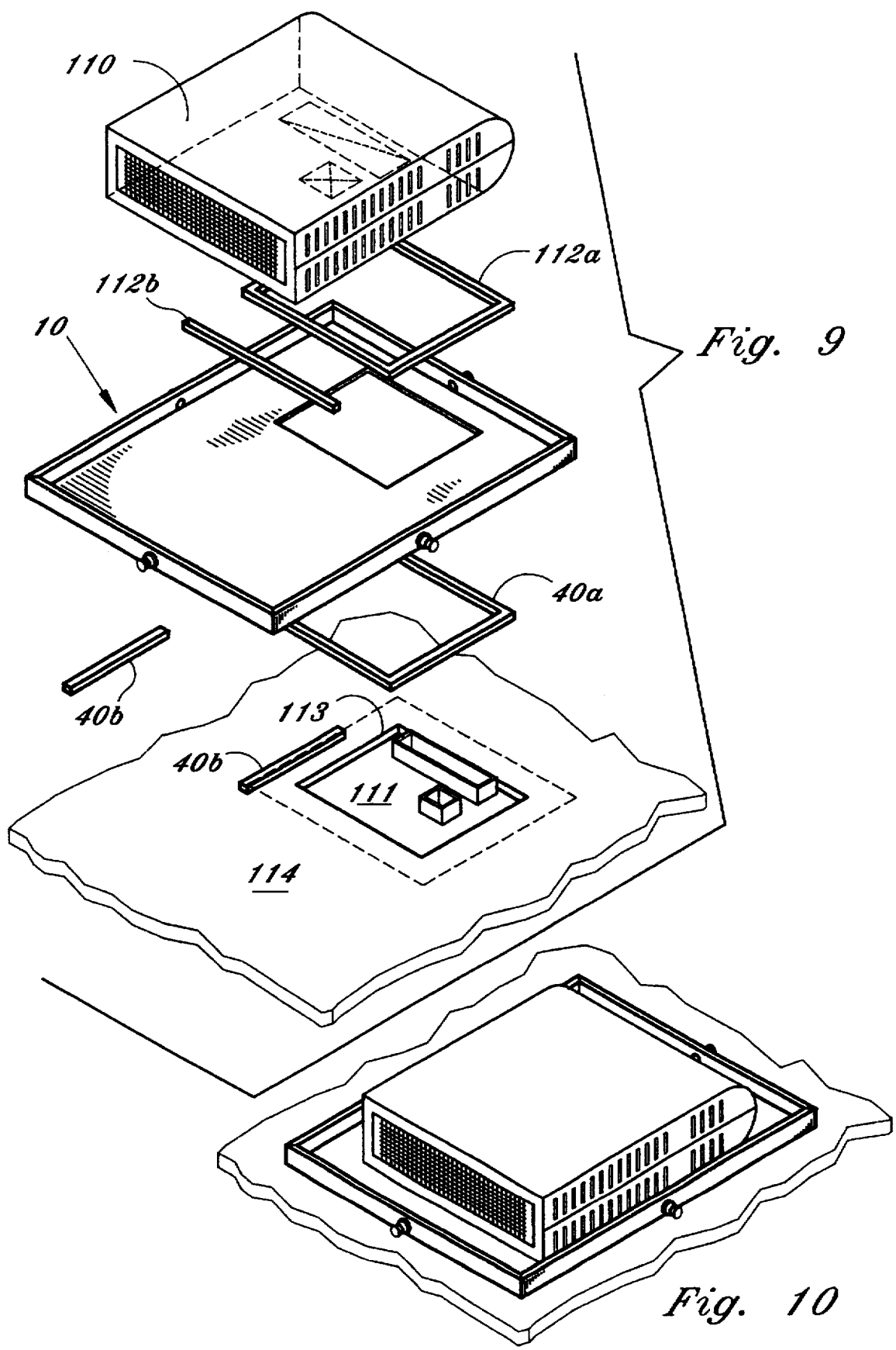
FIG. 9 is a detail, in exploded perspective view, of the mounting configuration for the drain pan of the present invention.
FIG. 10 is a partial detail, perspective view, of the mounting configuration for the drain pan of the present invention.
Figure 11:
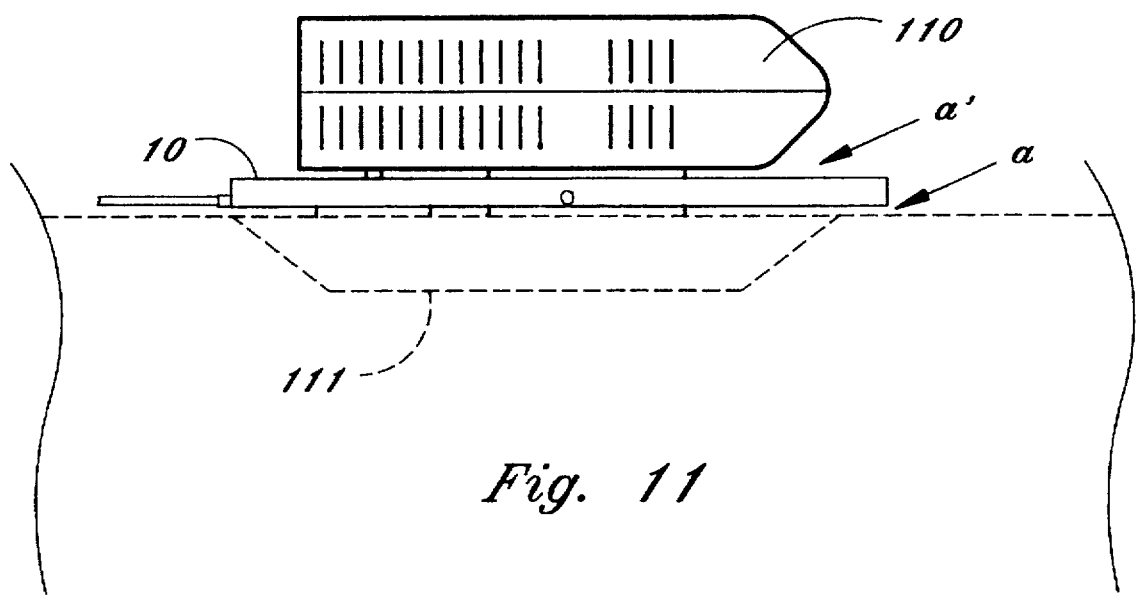
FIG. 11 is a partial detail, side elevational view, of the mounting configuration for the drain pan of the present invention.

The condensate drain pan of the present invention is used in connection with a roof mounted vehicle air conditioning unit as described below, and as depicted in FIGS. 4–6 and 9–12. A suitable vehicle, such as a motor home or other suitable recreational vehicle ("RV") 100, having a roof mounted package air conditioning unit (hereinafter "A/C unit") 110, is selected for installation of the drain pan 10 of the present invention. Typically, such a vehicle includes: (1) a package A/C unit 110 mounted externally on the roof of the vehicle; (2) a combination air distribution and control module 111 mounted internally within the vehicle, and; (3) a roof opening disposed therebetween for facilitating the electrical and air distribution connection of the externally mounted A/C unit and the internally mounted air distribution and control module 111. Initially, the A/C unit is removed from its installed position by the loosening of appropriate fasteners thereby allowing the A/C unit to be lifted from its mounted position. As best depicted in FIGS. 5 and 8. A/C unit 110 includes a base having an bottom surface to which a gasket 112a is attached for providing cushioned support and a positive seal between base of the A/C unit and the vehicle roof 114, and a quantity of gasket material 112b is attached for providing cushioned support. Gaskets 112a and 112b remain attached to the A/C unit at all times.

Figure 7:
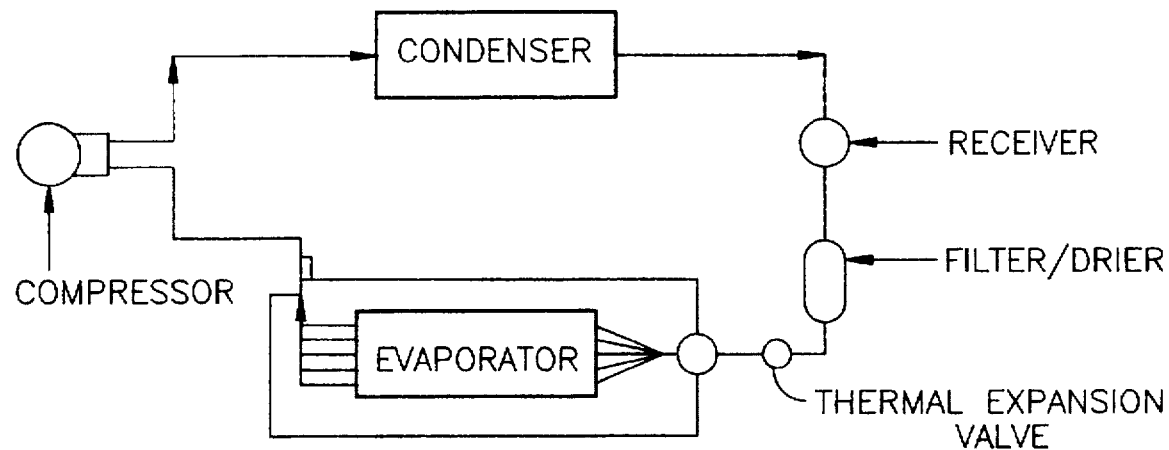
FIG. 7 is a schematic representation of the mechanical refrigeration components of the vehicle air conditioning system.

The condensate generating mechanical components that comprise the mechanical refrigeration system are schematically depicted in FIGS. 7 and 8. A view of the prior art mounting configuration for a roof mounted vehicle A/C unit is depicted in FIG. 5 (exploded), and FIG. 6 (installed).

After removal of A/C unit 110, the drain pan 10 of the present invention is positioned on the vehicle roof such that pan opening 26 and gasket 40a are aligned with an existing roof opening 113, whereby gasket 40a forms a positive seal between the vehicle roof 114 and the bottom surface 24 of pan floor 20. Next, the A/C unit 110 is lowered into position on top of the drain pan floor 20, and any necessary electrical and mechanical connections are made to the RV and the air distribution and control module 111. When appropriately mounted, the A/C unit's gasket 112a is suitably aligned with pan opening 26, whereby gasket 112a forms a positive seal between the top surface 22 of pan floor 20 and the bottom of the A/C unit. Finally the A/C unit is secured in its re-installed position by tightening of appropriate fasteners, whereby pan gaskets 40a and 40b, and A/C unit gaskets 112a and 112b are partially compressed. Accordingly, the installation of the present invention does not require any mechanical or electrical modification of the vehicle, or of the vehicle's A/C unit.

As is now apparent, gasket strips 40b provide additional cushioned support between pan 10 and roof 114 thereby eliminating vibration related noise and supporting the pan in spaced relation relative to roof 114. Similarly, A/C unit gasket 112b provides additional cushioned support between the A/C unit 110 and pan 10 thereby eliminating vibration related noise and supporting the A/C unit is spaced relation relative to pan surface 22.

As best depicted in FIG. 4, drain pan gasket 40 supports drain pan 10 in spaced relation with respect to the vehicle roof 114, thereby resulting in an air gap, generally referenced as "a", between the bottom surface 24 of the pan floor 20 and the vehicle roof 114. As previously discussed, A/C unit gaskets 112a and 112b support the A/C unit 110 in spaced relation relative to the top surface 22 of the pan floor 20, thereby resulting in an air gap, generally referenced as "a'", between the bottom of the A/C unit and the top surface of the drain pan. The formation of air gaps is desirable for allowing air flow between the respective structures to facilitate evaporation of moisture and thereby preventing corrosion. In addition, the air gap formed between the bottom of the A/C unit and the drain pan floor maintains the A/C unit above condensate pooling in the pan such that the unit is not subject to the corrosive effects of the pooled condensate.

Finally, at least one of the plurality of pan drain connection fittings 34 is selected for condensate drainage from the drain pan 10. The provision of a plurality of drain connection fittings 34 provides the user with various options for draining condensate from the pan. For example, if the vehicle is parked on an incline, the user should elect to connect condensate drainage tubing to the "lowest" drain connection fitting such that condensate readily drains from the pan and does not overflow lip 30.

Connection of condensate tubing 50 merely requires the removal of the appropriate drain plug 36 and connection of the tubing to the drain connection fitting 34. The routing and termination of the tubing are largely within the discretion of the user, however, as best depicted in FIG. 4, it has been discovered that drain tubing can be routed from the drain pan 10, down through the vehicle structure, such as down through an LP gas vent 52, to a termination point underneath, and to the rear of, the vehicle. In addition, the condensate tubing may terminate in a threaded fitting (not shown) for facilitating connection of the condensate tubing to additional tubing or a conventional garden hose for draining condensate at a location remote from the vehicle. This is particularly significant during the frequent circumstances where the A/C unit runs for substantial periods of time while the vehicle remains parked, and a pool of water formed by draining condensate in close proximity to the parked vehicle is undesirable.

Figure 12:
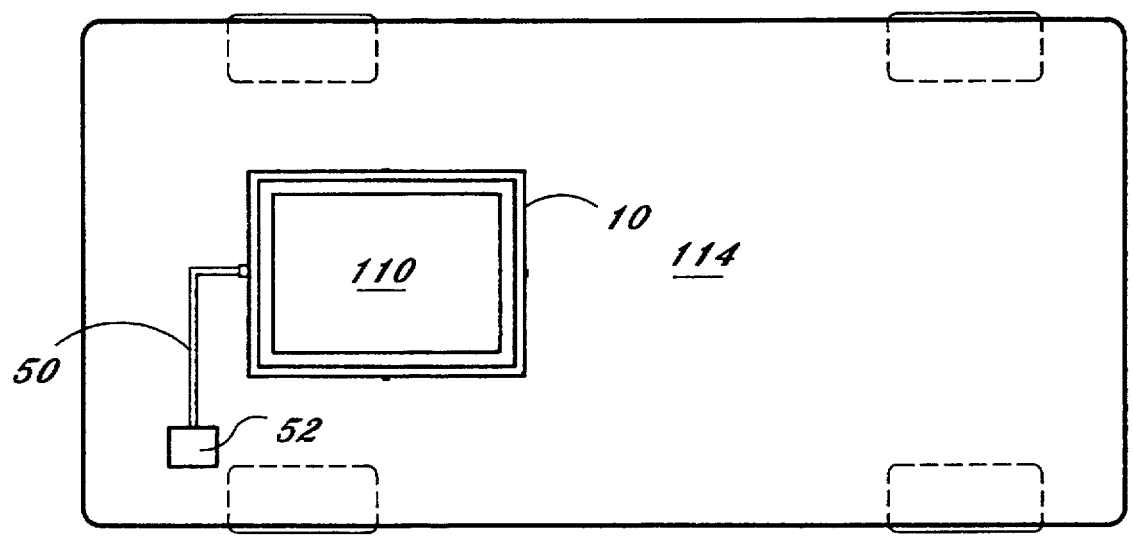
FIG. 12 is a schematic plan view of the mounting configuration for the drain pan of the present invention, illustrating one possible routing for condensate drain tubing.

In an alternate embodiment depicted in FIGS. 4 and 12, the invention contemplates collecting condensate for use in connection with the operation of the vehicle. For example, the condensate drain line may include a diverting valve 60 for selectively diverting the flow of condensate through a suitable filter 61 to a water storage tank 62. Water tank 62 may be a vehicle mounted tank for storing filtered condensate water within the vehicle for any suitable use.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A condensate drain pan for use with a roof mounted vehicle air conditioning unit, said unit of the type defined by a packaged unit externally mounted on the roof of a vehicle and having a gasket attached to a base, said unit having mechanical and electrical components connected through a roof opening to a mating air distribution and control module within said vehicle, said drain pan comprising:

a drain pan having a top surface and a bottom surface and a vertically extending peripheral lip;

said drain pan defining an opening therein, said bottom surface having a gasket attached thereto, said gasket surrounding said opening;

said drain pan having at least one means for draining condensate;

said drain pan being disposed between said vehicle roof and said air conditioning unit for collecting and draining condensate from said air conditioning unit.

2. A condensate drain pan for use with a roof mounted vehicle air conditioning unit, said unit of the type defined by a packaged unit externally mounted on the roof of a vehicle and having a gasket attached to a base, said unit having mechanical and electrical components connected through a roof opening to mating air distribution and control components within said vehicle, said drain pan comprising:

a substantially planar drain pan floor defining an opening, said drain pan floor having a top surface, a bottom surface, and a peripheral edge;

a peripheral lip integrally formed along said peripheral edge and extending normal to said drain pan floor top surface, whereby said peripheral lip and said drain pan floor top surface form a condensate collection pan;

said peripheral lip including at least one condensate drain fitting;

a gasket adhesively secured to said bottom surface, said gasket surrounding said opening, whereby said drain pan is disposed between said vehicle roof and said air conditioning unit such that said vehicle roof opening, said drain pan floor opening, and said air conditioning unit base are substantially aligned, said gasket surrounding said drain pan floor opening forming a positive seal between said vehicle roof and said drain pan floor bottom surface, and said gasket attached to said air conditioning unit base forming a positive seal between said air conditioning unit and said drain pan floor.

3. A condensate drain pan for use with a roof mounted vehicle air conditioning unit, said unit of the type defined by a packaged unit externally mounted on the roof of a vehicle and having a gasket attached to a base, said unit having mechanical and electrical components connected through a roof opening to mating air distribution and control components within said vehicle, said drain pan comprising:

a substantially planar drain pan floor having a top surface with a continuous peripheral lip extending normal thereto, and a bottom surface, said floor defining an opening for receiving air distribution and control components therethrough;

said lip including at least one means for connecting a condensate drain line;

said bottom surface having a sealing gasket attached thereto, said gasket surrounding said drain pan floor opening;

said drain pan having an installed position disposed between said vehicle roof and said air conditioning unit such that said vehicle roof opening, said drain pan floor opening, and said air conditioning unit base are substantially aligned, said gasket surrounding said drain pan floor opening forming a positive seal between said vehicle roof and said drain pan floor bottom surface, and said gasket attached to said air conditioning unit base forming a positive seal between said air conditioning unit and said drain pan floor.

4. A condensate drain pan for use with a roof mounted vehicle air conditioning unit according to claim 3, further including a condensate drain line connected to said means for connecting.

5. A condensate drain pan for use with a roof mounted vehicle air conditioning unit according to claim 4, further including means for diverting condensate from said drain line, a water filter means, and a water storage means, whereby condensate may be diverted from said drain line, filtered by said filter means and stored for use in said storage means.

6. A condensate drain pan for use with a roof mounted vehicle air conditioning unit according to claim 3, further including a quantity of resilient material attached to said bottom surface in spaced relation with said sealing gasket.

* * * * *